(12) United States Patent
Jung et al.

(10) Patent No.: US 12,374,683 B2
(45) Date of Patent: Jul. 29, 2025

(54) CATHODE ACTIVE MATERIAL COMPRISING LITHIUM PEROXIDE, CATHODE FOR A LITHIUM-ION BATTERY, LITHIUM-ION BATTERY, AND USE OF COATED LITHIUM PEROXIDE IN A LITHIUM-ION BATTERY

(71) Applicant: Bayerische Motoren Werke Aktiengesellschaft, Munich (DE)

(72) Inventors: Roland Jung, Munich (DE); Hideki Ogihara, Haimhausen (DE); Thomas Woehrle, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 630 days.

(21) Appl. No.: 17/628,977

(22) PCT Filed: Jul. 17, 2020

(86) PCT No.: PCT/EP2020/070341
§ 371 (c)(1),
(2) Date: Jan. 21, 2022

(87) PCT Pub. No.: WO2021/013744
PCT Pub. Date: Jan. 28, 2021

(65) Prior Publication Data
US 2022/0263075 A1 Aug. 18, 2022

(30) Foreign Application Priority Data

Jul. 22, 2019 (DE) ............... 10 2019 119 793.7

(51) Int. Cl.
| | | |
|---|---|---|
| *H01M 4/36* | (2006.01) | |
| *H01M 4/02* | (2006.01) | |
| *H01M 4/04* | (2006.01) | |
| *H01M 4/485* | (2010.01) | |
| *H01M 4/58* | (2010.01) | |
| *H01M 4/62* | (2006.01) | |
| *H01M 10/0525* | (2010.01) | |

(52) U.S. Cl.
CPC ........... *H01M 4/366* (2013.01); *H01M 4/485* (2013.01); *H01M 4/58* (2013.01); *H01M 4/623* (2013.01); *H01M 10/0525* (2013.01); *H01M 2004/021* (2013.01); *H01M 2004/028* (2013.01); *H01M 4/0428* (2013.01); *H01M 2220/20* (2013.01)

(58) Field of Classification Search
CPC ........ H01M 4/366; H01M 4/48; H01M 4/485; H01M 4/58; H01M 4/622; H01M 4/623; H01M 2004/028
See application file for complete search history.

(56) References Cited

U.S. PATENT DOCUMENTS

| | | | |
|---|---|---|---|
| 2011/0281154 A1* | 11/2011 | Vissers | ............... H01G 9/0003 562/587 |
| 2013/0089796 A1 | 4/2013 | Sun et al. | |
| 2013/0330630 A1* | 12/2013 | Christensen | .......... H01M 4/382 429/231.95 |
| 2014/0170485 A1 | 6/2014 | Lee et al. | |
| 2015/0093658 A1 | 4/2015 | Vajda et al. | |
| 2016/0049645 A1 | 2/2016 | Zheng et al. | |
| 2016/0260965 A1 | 9/2016 | Wu et al. | |
| 2017/0018760 A1* | 1/2017 | Lupart | ................ H01M 4/1391 |
| 2017/0194625 A1 | 7/2017 | Woehrle et al. | |
| 2018/0261880 A1 | 9/2018 | Marusczyk et al. | |

FOREIGN PATENT DOCUMENTS

| | | |
|---|---|---|
| CN | 102948006 A | 2/2013 |
| CN | 103035979 A | 4/2013 |
| CN | 103474671 A | 12/2013 |
| CN | 106165156 A | 11/2016 |
| CN | 106716681 A | 5/2017 |
| CN | 108028383 A | 5/2018 |
| CN | 109659533 A | 4/2019 |
| DE | 10 2014 219 421 A1 | 3/2016 |
| JP | 2011-108505 A | 6/2011 |
| WO | WO 2013/062313 A1 | 5/2013 |

OTHER PUBLICATIONS

Yitian Bie et al., "Li2O2 as cathode additive for the initial anode irreversibility compensation in lithium-ion batteries", Chemical Communications, vol. 53, No. 59, Jun. 30, 2017, pp. 8324-8327.*
Chinese-language Office Action issued in Chinese Application No. 202080050907.2 dated Apr. 20, 2023 with English translation (17 pages).
International Search Report (PCT/ISA/210) issued in PCT Application No. PCT/EP2020/070341 dated Oct. 22, 2020 with English translation (four (4) pages).
German-language Written Opinion (PCT/ISA/237) issued in PCT Application No. PCT/EP2020/070341 dated Oct. 22, 2020 (six (6) pages).
German-language Search Report issued in German Application No. 10 2019 119 793.7 dated Jan. 30, 2020 with a partial English translation (11 pages).
Yitian Bie et al., "Li$_2$O$_2$ as a cathode additive for the initial anode irreversibility compensation in lithium-ion batteries", Chemical Communications, vol. 53, No. 59, Jun. 30, 2017, pp. 8324-8327, XP055617194.

* cited by examiner

*Primary Examiner* — Brittany L Raymond
(74) *Attorney, Agent, or Firm* — Crowell & Moring LLP

(57) ABSTRACT

A cathode active material comprises lithium peroxide, wherein the lithium peroxide is provided at least in part with a coating, and wherein the coating comprises a non-metal inorganic compound. Furthermore, a cathode for a lithium-ion battery, and a lithium-ion battery, are specified, which comprise such a cathode active material. In addition, the use of coated lithium peroxide in the production of a lithium-ion battery is described.

26 Claims, No Drawings

CATHODE ACTIVE MATERIAL COMPRISING LITHIUM PEROXIDE, CATHODE FOR A LITHIUM-ION BATTERY, LITHIUM-ION BATTERY, AND USE OF COATED LITHIUM PEROXIDE IN A LITHIUM-ION BATTERY

BACKGROUND AND SUMMARY OF THE INVENTION

The invention relates to an active cathode material comprising lithium peroxide, to a cathode for a lithium ion battery, to a lithium ion battery, and to the use of coated lithium peroxide in a lithium ion battery.

The expression "lithium ion battery" is used synonymously hereinafter for all terms commonly used in the prior art for lithium-containing galvanic elements and cells, for example lithium battery, lithium ion cell and lithium ion accumulator. More particularly, rechargeable batteries (secondary batteries) are included. The expression "battery" is also used synonymously with the expression "lithium ion battery". The lithium ion battery may also be a solid-state battery.

A lithium ion battery has at least two different electrodes: a positive electrode (cathode) and a negative electrode (anode). Each of these electrodes has at least one active material.

In lithium ion batteries, both the active cathode material and the active anode material may be capable of accepting and releasing lithium ions.

Lithium ion batteries are usually assembled and finished in the discharged state. This corresponds to a state in which the lithium ions are fully intercalated, i.e. embedded, in the cathode, whereas the anode typically does not include any intercalated lithium ions. Also known in the prior art, however, are lithium ion batteries in which the anode may already have been at least partly charged with lithium ions during the finishing.

In the first charging operation of the lithium ion battery, which is also known by the term "formation", the lithium ions leave the cathode and accumulate in the anode. This first charging operation includes complex processes with a multitude of reactions that proceed between the different components of the lithium ion battery.

Of particular significance here is the formation of what is called a solid electrolyte interphase (SEI) on the anode. The development of the SEI is attributed essentially to breakdown reactions of the electrolyte with the surface of the active anode material.

However, the establishment of the SEI requires lithium, which is no longer available later for cycling in the charging and discharging process. The difference between the capacity after the first charge and the capacity after the first discharge, relative to the charging capacity, is referred to as formation loss and, according to the cathode material and anode material used, may be in the range from about 5% to 40%.

Therefore, the active cathode material may be oversized in order to achieve a desired nameplate capacity of the finished lithium ion battery even after the formation loss, which increases production costs and lowers the specific energy of the battery. An additional result is unnecessary consumption of globally scarce resources such as nickel and cobalt.

DE 10 2014 219 421 A1 describes a lithium ion battery comprising a cathode with an active cathode material to which lithium peroxide has been added. The lithium peroxide breaks down preferentially during the formation, such that no lithium from the rest of the active cathode material is consumed. The only breakdown product formed by lithium peroxide aside from the desired lithium ions is oxygen, which can be removed in a simple manner. Thus, no unnecessary constituents remain within the cathode after the formation.

However, it has been found that the lithium peroxide in such a lithium ion battery, as well as its desired function, can also act as oxidizing agent with respect to further constituents of the lithium ion battery. For instance, lithium peroxide can attack the electrode binder, conductivity additives such as conductive graphite and conductive carbon black, and the organic carrier solvent. The lithium peroxide can also react with the battery electrolyte.

Overall, therefore, the lifetime and reliability of the battery can fall as a result of the breakdown products formed in the side reactions. In addition, the lithium peroxide added is also not fully available for the formation as a result of the unwanted side reactions.

DETAILED DESCRIPTION

It is therefore an object of the invention to provide an inexpensive active cathode material that has sufficient chemical and electrochemical stability and assures reliable formation of the lithium ion battery.

The object is achieved in accordance with the invention by an active cathode material comprising lithium peroxide, wherein the lithium peroxide has at least partly been provided with a coating, where the coating comprises a nonmetallic inorganic compound.

The coating applied to lithium peroxide fulfills the function of a chemical and electrochemical protective layer. This sufficiently reduces the reactivity of the lithium peroxide toward further constituents of the active cathode material and/or of the lithium ion battery for the application. The coating thus has a phlegmatizing effect.

At the same time, however, the lithium peroxide can also break down during the formation to form lithium ions and hence assure reliable formation to obtain the remainder of the active cathode material, and hence exert its desired function in the formation of the SEI.

Correspondingly, the further constituents of the active cathode material need not be oversized since the lithium peroxide provides the lithium ions required during the formation. It is thus possible to reduce the use of costly and/or toxic components in the active cathode material, for example cobalt and nickel.

The lithium peroxide preferably takes the form of solid particles that may be distributed homogeneously in the rest of the active cathode material. Alternatively, the lithium peroxide may also be disposed in regions separated from the rest of the active cathode material, preferably in an outer layer or top layer. The average grain size (according to sieve analysis) of the lithium peroxide is preferably within a range from 0.05 μm to 20 μm, more preferably from 0.1 μm to 5 μm, most preferably from 0.2 μm to 3 μm.

The grain size of the particles can be used to adjust the reaction characteristics during the formation and the porosity of the active cathode material after the formation.

Smaller particles break down more quickly and reliably during the formation. At the same time, however, the complexity involved in processing and in producing the particles and the electrode is increased for smaller particles, and so a compromise has to be found.

A further means of influencing the reaction characteristics of the solid particles lies in the selection of the particle size distribution. For instance, it is to be expected that a narrow particle size distribution will enable a controlled and uniform reaction during the formation.

The nonmetallic inorganic compound preferably forms a solid coating that adheres reliably to and/or is anchored on the lithium peroxide and is chemically stable with respect to lithium peroxide. Thus, as well as chemical stabilization, additional mechanical stabilization of the lithium peroxide is achieved.

Further constituents used in the active cathode material may be any of the materials known from the prior art. These include, for example, $LiCoO_2$, lithium-nickel-cobalt-manganese compounds (known by the abbreviation NCM or NMC), lithium nickel cobalt aluminum oxide (NCA), lithium iron phosphate and other olivine compounds, and lithium manganese oxide spinel (LMS or LMO). It is also possible to use what are called overlithiated layered oxides (OLOs).

The active cathode material may also contain mixtures of two or more of the compounds mentioned.

In addition, the active cathode material may include further additions, for example carbon or carbon compounds, especially conductive carbon black and/or graphite. Such additions may serve as conductivity improvers for increasing the electrical conductivity.

In a preferred embodiment, the coating on the lithium peroxide may comprise a solid lithium ion conductor. Useful lithium ion conductors include all customary lithium ion conductors from the prior art.

Preferred lithium ion conductors are especially what are called lithium garnets, which have a garnet-like crystal structure and are able to conduct lithium ions in a particularly effective manner. This enables faster kinetics of the migrating lithium ions, which results in a lower internal cell resistance. Lithium garnets additionally feature high chemical and electrochemical stability.

An example of a lithium ion conductor having a garnet-like crystal structure that may be used is $Li_7La_3Zr_2O_{12}$, and doped variants of this compound are also useful. Examples of suitable dopants include gallium or tantalum. Further suitable lithium garnets are compounds of the formula $Li_5La_3M_2O_{12}$ with M=Ta, Nb, or $Li_6ALa_2M_2O_{12}$ with A=Ca, Sr, Ba and M=Ta, Nb. Additionally or alternatively to the lithium ion conductors mentioned, the coating may comprise a material selected from the group consisting of $AlF_3$, $Al_2O_3$, $TiO_2$, $Nb_2O_5$, $WO_3$, $SiO_2$, silicates, zirconates, niobates, tantalates and/or combinations thereof.

The coating material is chosen such that sufficient adhesion to lithium peroxide and sufficient passivation with respect to the further constituents of the lithium ion battery can be achieved.

The coating preferably has a layer thickness of not more than 100 nm, especially of not more than 20 nm. Material consumption rises in the case of thicker coatings, which causes higher costs and can lower the specific energy of the lithium ion battery. Moreover, the coating should only be so thick that it does not result in any increase in internal cell resistance and does not impair the breakdown of the lithium peroxide during the formation of the battery.

The layer thickness of the coating is chosen at least so as to achieve sufficient lowering of the reactivity of the lithium peroxide.

In one variant, the coating is a monolayer on the lithium peroxide.

The coating comprising the nonmetallic inorganic material preferably covers at least 40% of the surface area of the lithium peroxide. The surface area is preferably at least 60% covered, more preferably at least 80%, and the surface is especially preferably fully covered with the coating.

In the case of lower coverage than 40% of the total surface area, insufficient lowering of the reactivity of the lithium peroxide is achieved.

What is desirable is maximum coverage of the lithium peroxide in order to avoid unwanted reactions with further constituents of the lithium ion battery.

The coating of lithium peroxide can be effected by means of sol-gel synthesis, laser beam evaporation (pulsed laser deposition, PLD) and/or atomic layer deposition (ALD). These methods are known in principle to the person skilled in the art.

Starting materials for the sol-gel synthesis are suitable precursors for the coating material in sol form, and lithium peroxide is added in solid form. During gel formation, the precursors accumulate on the surface of lithium peroxide and form the coating on the lithium peroxide later on. The concentration of the precursors in the sol can be used to exactly adjust the resulting layer thickness of the coating.

In laser beam evaporation, the material to be deposited is evaporated by means of high-intensity pulsed laser radiation. Subsequently, the resultant material vapor can precipitate on the lithium peroxide provided and hence form the coating. The pulse length and number of laser pulses can be used to adjust the resulting layer thickness of the coating.

In atomic layer deposition, two reactants are guided successively into a chamber containing the substrate to be coated, lithium peroxide here, by means of a carrier gas and reacted on the surface of the substrate. This can achieve very thin and mechanically stable coatings.

The object is additionally achieved in accordance with the invention by a cathode for a lithium ion battery, comprising an active cathode material of the type described above.

As well as the active material, the cathode may comprise a carrier to which the active material has been applied, for example a metallic carrier made of aluminum. This carrier is also referred to as conductor or collector.

In addition, the cathode may include a binder (electrode binder) that holds the active material together. The electrode binder may be selected from the group consisting of polyvinylidene fluoride (PVdF), polyvinylidene fluoride-hexafluoropropylene copolymer (PVdF-HFP), polyethylene oxide (PEO), polytetrafluoro-ethylene (PTFE), polyacrylate, styrene-butadiene rubber, polyvinylpyrrolidone (PVP), carboxymethyl cellulose (CMC) and mixtures and copolymers thereof.

The electrode binder is preferably present in an amount of 0.5% to 8% by weight, based on the total mass of all materials used in the assembled electrode.

The inventive coating of the lithium peroxide likewise prevents unwanted reactions of the lithium peroxide with the carrier and/or the electrode binder of the cathode.

The cathode may also comprise further additions and additives, for example conductivity improvers.

The invention further provides a lithium ion battery comprising an active cathode material or a cathode of the type described above.

The lithium ion battery also has an anode as well as the cathode. Useful active anode materials include all the customary materials known from the prior art.

For example, the active anode material may be selected from the group consisting of lithium metal oxide, for instance lithium titanium oxide, metal oxides, such as $Fe_2O_3$, ZnO, $ZnFe_2O_4$, carbonaceous materials, for instance graphite, synthetic graphite, natural graphite, graphene, mesocarbon, doped carbon, hard carbon, soft carbon, fullerenes, mixtures of silicon and carbon, silicon, lithium alloys and mixtures thereof. A pure lithium anode is also possible.

Electrode materials used for the negative electrode may also be niobium pentoxide, tin alloys, titanium dioxide, titanates, tin dioxide and silicon.

Between the cathode and the anode, the lithium ion battery of the invention has a separator that separates the two electrodes from one another. The separator is permeable to lithium ions, but is a nonconductor for electrons.

Separators used may be polymers, especially a polymer selected from the group consisting of polyesters, especially polyethylene terephthalate, polyolefins, especially polyethylene or polypropylene, polyacrylonitriles, polyvinylidene fluoride, polyvinylidene-hexafluoropropylene, polyetherimide, polyimide, polyether, polyetherketone or mixtures thereof.

In addition, the lithium ion battery has an electrolyte which is conductive for lithium ions and which may be either a solid-state electrolyte or a liquid comprising a solvent and at least one conductive lithium salt dissolved therein.

The solvent is preferably inert. Suitable solvents are, for example, organic solvents such as ethylene carbonate, propylene carbonate, butylene carbonate, dimethyl carbonate, diethyl carbonate, ethyl methyl carbonate, sulfolanes, 2-methyltetrahydrofuran and 1,3-dioxolane.

Solvents used may also be ionic liquids. Such ionic liquids contain exclusively ions. Preferred cations, which may especially be alkylated, are imidazolium, pyridinium, pyrrolidinium, guanidinium, uronium, thiuronium, piperidinium, morpholinium, sulfonium, ammonium and phosphonium cations. Examples of usable anions are halide, tetrafluoroborate, trifluoroacetate, triflate, hexafluorophosphate, phosphonate and tosylate anions.

Illustrative ionic liquids include: N-methyl-N-propyl-piperidinium bis(trifluoromethylsulfonyl)imide, N-methyl-N-butylpyrrolidinium bis(trifluoromethyl-sulfonyl)imide, N-butyl-N-trimethylammonium bis(trifluoromethylsulfonyl)imide, triethylsulfonium bis(trifluoromethylsulfonyl)imide and N,N-diethyl-N-methyl-N-(2-methoxyethyl)ammonium bis(trifluoromethyl-sulfonyl)imide.

In one variant, two or more of the abovementioned liquids may be used.

Preferred conductive salts are lithium salts which have inert anions and which are preferably nontoxic. Suitable lithium salts are especially lithium hexafluorophosphate ($LiPF_6$), lithium tetrafluoroborate ($LiBF_4$) and mixtures of these salts.

The separator may be impregnated or wetted with the lithium salt electrolyte if it is liquid.

The coating of the lithium peroxide likewise prevents unwanted reactions of lithium peroxide with the separator and the electrolyte and with further constituents of the cathode, for example conductive additives, a collector foil or a carrier solvent.

The lithium ion battery having the active cathode material of the invention may especially be provided in a motor vehicle or a portable device. The invention thus also relates to such a vehicle or portable device comprising a lithium ion battery of the type described above. The portable device may especially be a smartphone, a tablet or a wearable.

The invention further relates to the use of coated lithium peroxide in a lithium ion battery.

The coated lithium peroxide may take the form of a mixture with the active cathode material and may preferably be distributed homogeneously in the active cathode material. Alternatively, the coated lithium peroxide may be present in delimited regions of the active cathode material. For example, it is also possible to apply the coated lithium peroxide as an outer layer to the active cathode material.

The proportion of lithium peroxide based on lithium content of the active cathode material may be 1 to 60 mol %, preferably 2 to 50 mol % and more preferably 3 to 40 mol %.

For production of the lithium ion battery, the active cathode material may be suspended in a solvent, preferably an inert organic solvent, together with the coated lithium peroxide and further additions such as binder and conductivity improver, and applied to a carrier. After drying, the cathode thus produced, containing the coated lithium peroxide, may be assembled together with an electrolyte, a separator and an anode, and also housing, to form a lithium cell.

For formation, the cell thus produced is charged for the first time by applying a predetermined voltage and subsequently discharged. Lithium peroxide is decomposed irreversibly during the formation of lithium ion battery.

In this way, the lithium peroxide can reduce any loss of active cathode material in the lithium ion battery, since the lithium peroxide breaks down preferentially during the formation, and lithium ions released can be used for formation of the SEI.

The coating on the lithium peroxide ensures that the breakdown of the lithium peroxide does not take place before the formation, and no unwanted side reactions take place between the lithium peroxide and the further constituent of lithium ion battery.

What is claimed is:

1. An active cathode material comprising:
   an active material constituent;
   lithium peroxide in a form of solid particles; and
   a coating covering the lithium peroxide,
   wherein the coating comprises a nonmetallic inorganic compound, and
   wherein the lithium peroxide is not homogeneously distributed in the active cathode material.

2. The active cathode material according to claim 1, wherein the coating comprises a solid lithium ion conductor.

3. The active cathode material according to claim 2, wherein the solid lithium ion conductor comprises a lithium garnet.

4. The active cathode material according to claim 3, wherein the lithium garnet comprises: $Li_7La_3Zr_2O_{12}$; $Li_5La_3M_2O_{12}$ with M=Ta or Nb; or $Li_6ALa_2M_2O_{12}$ with A=Ca, Sr, or Ba and M=Ta or Nb.

5. The active cathode material according to 1, wherein the coating comprises one or more materials selected from the group consisting of: $AlF_3$, $Al_2O_3$, $TiO_2$, $Nb_2O_5$, $WO_3$, $SiO_2$, a silicate, a zirconate, a niobate, and a tantalate.

6. The active cathode material according to claim 1, wherein the coating has a layer thickness of not more than 100 nm.

7. The active cathode material according to claim 6, wherein the layer thickness is not more than 50 nm.

8. The active cathode material according to claim 1, wherein the coating comprises a monolayer on the lithium peroxide.

9. The active cathode material according to claim 1, wherein the coating is formed by sol-gel synthesis, laser beam evaporation (PLD) and/or atomic layer deposition (ALD).

10. The active cathode material of claim 1, wherein the active material constituent is selected from the group consisting of $LiCoO_2$, a lithium-nickel-cobalt-manganese compound (NCM or NMC), lithium nickel cobalt aluminum oxide (NCA), lithium iron phosphate, lithium manganese oxide spinel (LMS or LMO), and overlithiated layered oxide (OLO).

11. The active cathode material of claim 1, wherein the lithium peroxide is disposed only in an outer layer or a top layer of the active cathode material.

12. The active cathode material of claim 1, wherein a proportion of the lithium peroxide based on lithium content of the active cathode material is 1 to 60 mol %.

13. The active cathode material of claim 12, wherein the proportion of the lithium peroxide based on the lithium content of the active cathode material is 3 to 40 mol %.

14. A cathode for a lithium ion battery comprising a carrier supporting the active cathode material according to claim 1.

15. The cathode according to claim 14, wherein the carrier comprises aluminum.

16. The cathode according to claim 14, further comprising an electrode binder holding the active cathode material together.

17. The cathode according to claim 16, wherein the electrode binder includes one or more polymers selected from the group consisting of: polyvinylidene fluoride (PVdF), polyvinylidene fluoride-hexafluoropropylene copolymer (PVdF-HFP), polyethylene oxide (PEO), polytetrafluoro-ethylene (PTFE), polyacrylate, styrene-butadiene rubber, polyvinylpyrrolidone (PVP), and carboxymethyl cellulose (CMC).

18. A lithium ion battery comprising:
the cathode according to claim 14; and
an anode comprising an anode active material separated from the cathode by a separator permeable to lithium ions.

19. A vehicle or portable device having the lithium ion battery according to claim 18.

20. A method of forming the lithium ion battery according to claim 18 utilizing coated lithium peroxide.

21. The method according to claim 20, wherein the coated lithium peroxide is broken down during the formation of the lithium ion battery.

22. An active cathode material comprising:
an active material constituent;
lithium peroxide in a form of solid particles; and
a coating covering the lithium peroxide,
wherein the coating comprises a nonmetallic inorganic compound,
wherein a proportion of the lithium peroxide based on lithium content of the active cathode material is in a range from 3 mol % to 40 mol %.

23. The active cathode material of claim 22, wherein the active material constituent is selected from the group consisting of $LiCoO_2$, a lithium-nickel-cobalt-manganese compound (NCM or NMC), lithium nickel cobalt aluminum oxide (NCA), lithium iron phosphate, lithium manganese oxide spinel (LMS or LMO), and overlithiated layered oxide (OLO).

24. The active cathode material of claim 22, wherein the coating comprises a solid lithium ion conductor.

25. The active cathode material of claim 22, wherein the lithium peroxide is homogeneously distributed in the active cathode material.

26. The active cathode material of claim 22, wherein the lithium peroxide is not homogeneously distributed in the active cathode material.

* * * * *